J. F. McMILLIAN.
FISHING TOOL.
APPLICATION FILED JUNE 3, 1919.

1,392,650.

Patented Oct. 4, 1921.

INVENTOR
John F. McMillian
BY
Hardway Cathy
ATTORNEYS.

UNITED STATES PATENT OFFICE.

JOHN F. McMILLIAN, OF HUMBLE, TEXAS.

FISHING-TOOL.

1,392,650.  Specification of Letters Patent.  Patented Oct. 4, 1921.

Application filed June 3, 1919. Serial No. 301,481.

*To all whom it may concern:*

Be it known that JOHN F. McMILLIAN, a citizen of the United States, residing at Humble, in the county of Harris and State of Texas, has invented certain new and useful Improvement in a Fishing-Tool, of which the following is a specification.

This invention relates to new and useful improvements in a fishing tool.

The object of the invention is to provide a device of the character described which is adapted to be let down into a well bore, for engagement with the pipe in said bore, whereby said pipe may be withdrawn. In drilling wells, the pipe lowered in drilling often becomes stuck in the bore and is sometimes twisted off, and in such cases, it is necessary to let down a fishing tool to engage with the pipe stuck in the bore in order to withdraw the same. It is the object of this invention to provide a fishing tool of the character described for this purpose.

Another object of the invention is to provide a fishing tool of the character described which, when let down into the bore, may be readily engaged with the pipe and which may also be easily released from the pipe.

A further feature of the invention resides in the provision of a fishing tool which is simple in construction and may be easily and cheaply manufactured and readily applied to the work for which it is intended.

With the above and other objects in view, the invention has particular relation to certain novel features of construction, operation and arrangement of parts, an example of which is given in this specification and illustrated in the accompanying drawings wherein.

Figure 3:
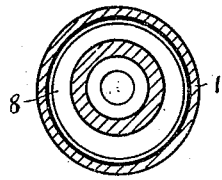
Fig. 3, shows a transverse sectional view taken on the line 3—3 of Fig. 1.
Figure 4:
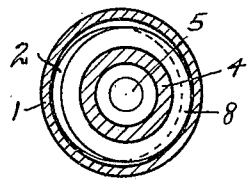
Fig. 4, shows a transverse sectional view taken on the line 4—4 of Fig. 2.
Figure 1:
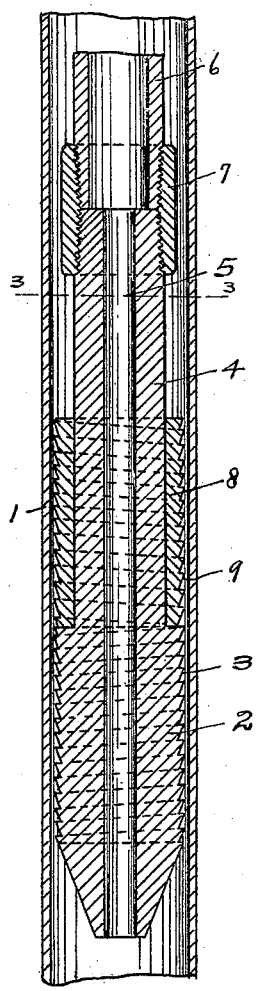
Figure 1, is a vertical sectional view of the tool within the pipe to be pulled, but out of engagement with said pipe.
Figure 2:
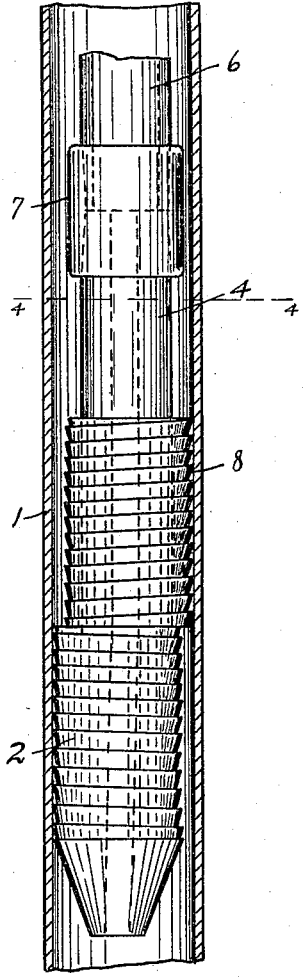
Fig. 2, shows a side view of the tool within the pipe and engaged therewith.

Referring now more particularly to the drawings wherein like numerals of reference designate similar parts in each of the figures, the numeral 1, designates the pipe to be pulled and the numeral 2 refers to a spear head, forming a part of the fishing tool. The periphery of the head has the spiraled rib 3, which, in cross section, presents a serrated appearance, forming, in effect, upwardly inclined engaging teeth. Integral with said head, there is the upwardly extending blank neck 4, having the water course 5, extending downwardly therethrough, which continues down through the head and this neck is attached to the lower end of the stem 6, through the ordinary coupling 7. As illustrated in Figs. 2, 3 and 4, the blank neck 4, is eccentric relative to the head 2, and upon said neck, there is the eccentric sleeve 8, having the peripheral spiraled rib 9, inclined oppositely with respect to the rib 3, and in cross section, presenting a serrated appearance, thus, in effect, providing upwardly inclined teeth, for engagement with the pipe. The diameter of the sleeve 8 is equal to that of the head 2, and is somewhat less than the inside diameter of the pipe to be pulled, so that when the sleeve 8 is turned into perfect alinement with the head 2, as shown in Fig. 3, the fishing tool may be readily let down into the pipe 1. The stem 6 is then rotated and the friction of the pipe against the sleeve 8 will operate to bring said sleeve out of alinement with the head, as illustrated in Figs. 2 and 4, causing the spiraled ribs 3 and 9 to engage with the pipe, or in other words, causing the fishing tool to wedge in said pipe. An upward pull on the stem 6 will then operate to withdraw the fishing tool and the pipe with it from the bore. In case the pipe is stuck in the bore, so that it can not be withdrawn, the pipe 6 may be then rotated backwardly sufficiently to release the tool from the pipe, and the tool may be then readily withdrawn, leaving the pipe in the hole.

What I claim is:

A fishing tool including a head, having peripheral teeth, a blank neck, carried by the head and eccentric with respect thereto, a stem to which said neck is attached and through which the tool may be rotated, an eccentric sleeve on said neck provided with peripheral teeth, said tool having a water course extending therethrough from the upper to the lower end thereof, through which water may be forced through said tool.

In testimony whereof he has signed his name to this specification in the presence of two subscribing witnesses.

JOHN F. McMILLIAN.

Witnesses:
J. G. TONS,
ED RILEY.